Oct. 5, 1965   J. A. BELLEZANNE   3,209,983
METHOD FOR THE MANUFACTURE OF FLEXIBLE CONTAINERS
AND THE LIKE AND PRODUCTS OBTAINED BY THE METHOD
Filed Dec. 4, 1962
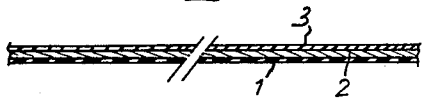
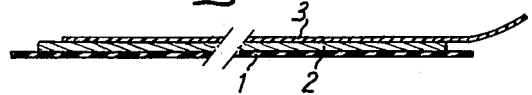
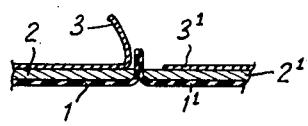
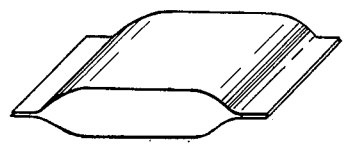
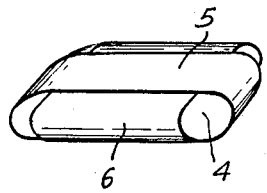
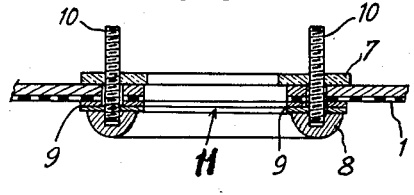
INVENTOR:
JEAN ANDRÉ BELLEZANNE
BY Irvin S. Thompson
ATTORNEY United States Patent Office 3,209,983
Patented Oct. 5, 1965

3,209,983
METHOD FOR THE MANUFACTURE OF FLEX-
IBLE CONTAINERS AND THE LIKE AND
PRODUCTS OBTAINED BY THE METHOD
Jean André Bellezanne, 36 Ave. de Neuilly,
Neuilly-sur-Seine, France
Filed Dec. 4, 1962, Ser. No. 242,154
Claims priority, application France, Dec. 8, 1961, 881,395
11 Claims. (Cl. 229—53)

The present invention relates to a process for the manufacture of flexible containers and other flexible objects comprising composite walls, constituted by a superimposition of a plurality of layers of different materials, and to the products obtained by this process.

In order to simplify the description, only containers will be discussed below.

The main purposes of the invention are to obtain containers having the following qualities:

(1) Reduced bulk and weight when they are not filled;

(2) Internal layer which is subjected little if any to the forces exerted upon the filled container, which layer can be placed in contact with the container product, without disadvantage or damage;

(3) Middle or external layer resisting the forces, especially the tensile forces, which are exerted upon the walls of the filled container;

(4) External layer resistant to the effects of the external medium in various circumstances of use of the container, especially the chemical and/or bacteriological effects and/or the effects of wear.

Generally the number of layers of the walls is two or three.

Further purposes and advantages will appear in the following description.

Flexible containers are already known which are produced from natural or synthetic rubber, reinforced in the manner of automobile pneumatic tires, by the immersion in the mass of rubber of one or more sheets of fabric or of textile or other threads or wires, intended to reinforce the wall of the containers. The manner of manufacture implies the use of separable and consequently burdensome molds, on which the rubber and its sheets of threads are mounted in the crude state. These initial products are vulcanized in kilns which must sometimes be of large dimensions, and costly in operation. For these reasons this style of manufacture is conceived only for mass production, but not for the production of less numerous elements responding to a particular program. The nature of the internal surface of these containers does not permit filling with all products. This can be the case with foodstuff products, unless special rubber formulations are used.

On the other hand the process according to the present invention, which consists mainly in using assemblies of sheets or laminates which are prepared in advance and cut to shape, permits the creation of containers whose internal surface is lined with a barrier material, possibly very thin, having qualities fixed as a function of the filling product. The mechanical strength and the resistance to the external medium are obtained by different layers of the wall. Assembly can be effected by adhesion or welding and in particular by high frequency welding. The process applied to the internal layer, without addition of welding material, permits of obtaining good sealing and the maintenance of the qualities of the sole barrier material.

Sticking is a means of assembly which is applicable particularly to the middle and external layers.

Either contact and pressure adhesives or self-vulcanizing glues are preferable. Pressure adhesives have the advantage of obtaining good adhesion of the various layers in contact after assembly, without preventing, before assembly, the momentary separation of the layers, close to the edges of the elements to be bonded together.

The description of various embodiments represented in the attached figures which are given by way of nonlimitative examples of the invention will permit of better understanding of the latter.

FIGURE 1 is a section of an assembly of sheets or a laminate of three layers.

FIGURE 2 is a section of an assembly of sheets or a laminate of three layers showing the preparation of the selvages of the laminate.

FIGURES 3, 5 and 7 are sections of various assemblies of sheets or laminates showing the preparatory welding of the internal layer.

FIGURES 4, 6, 8 correspond respectively to FIGURES 3, 5, 7 and are sections of the preceding laminates, showing the completion of the joint between two adjacent assemblies of sheets.

FIGURES 9 and 10 are perspective views of completed containers.

FIGURE 11 is a cross section through an opening of a container.

FIGURE 1 shows an assembly of sheets composed of three layers of different materials, the layer 1 being intended to constitute the internal surface of the containers.

FIGURE 2 indicates the possibility, with the previous laminate, of disposing the materials with different overlaps, at the edge of the laminate.

FIGURES 3 and 4 give an example of connection between two adjacent laminates, such as that in FIGURE 2. The adhesion between the materials 2 and 3, $2^1$ and $3^1$ is proposed to be effected with a pressure adhesive. FIGURE 3: the edge of 3 is raised, the edges of 1 are raised on the side opposite to the interior of the container in manufacture and are united by high frequency welding. FIGURE 4: The edges of 1 and $1^1$ after welding are turned over on $2^1$ and the edge of 3 is applied upon these flanges and upon $3^1$ by using the adhesive with which it is coated.

FIGURES 5 and 6 on the one hand, 7 and 8 on the other, give two further examples of the joining of laminates with two or three layers.

It may be seen that by cutting to shape and bonding it is possible to produce all shapes of containers with developable surfaces such as those represented in FIGURES 9 and 10. The transverse elements 5 and 6, despite their convexity, can be manufactured from suitably cut laminates, their edges being placed tangentially of the corresponding edges of 5 and 6 and assembled reciprocally as indicated above.

Grasping handles and orifices are fixed on the containers in question, as is already done on known flexible containers. These accessories thus enter little into the scope of the patent.

By way of example however FIGURE 11 shows an opening comprising a metallic collar 7 placed around a hole 11 in the container constituted by the laminate 1, 2, a metallic back-up collar 8, an annular joint 9 and assembling screws 10 which can serve for the securing of the closure piece.

As regards the materials usable for the production of the laminates, the present invention does not establish a limitation. The following materials will be indicated by way of example:

For the layer which must be the internal layer of the containers, all thermo-weldable films are usable, whether they are weldable by high frequency or by impulses. The materials will be for example polyamides, vinyl chloride, polyethylene, products known under the trade names and trademarks "rilsan," "Teflon," etc.

For the intermediate (and possibly external) layer, all reinforcing fabrics and fibres can be used, the selection bearing upon the uses and necessary strengths: Artificial fibres known under the trade names and trademarks nylon, "Tergal," rayon, etc.; glass fibres, cotton, etc. These fabrics will frequently be impregnated with a material ensuring continuous surfaces, suitable for adhesives bonding. This will be the case with neoprene-impregnated cloths, which can act as intermediate and external layer.

The product of the external layer most frequently used will be neoprene, by reason of its resistance to weather and moisture. It is also possible to use the products known under the trademarks "Hycar," "Hypalon," "Viton," etc. It is also possible to use an external coating based upon chlorinated rubber ensuring not only incombustibility of the laminate but also the extinguishing of incipient fires.

The principal glues used for producing the laminates and in their assembly are, as stated, contact and pressure adhesives. One current example is a mixture of neoprene and isocyanate. The following formula can also be cited:

5 to 10% of neoprene; 5 to 10% of paracryl; 20 to 30% of gum ester; the remainder being trichloroethylene serving as solvent.

For the materials such as polythene and Teflon for which adhesive bonding is practically impossible, it is possible to use mixtures of natural or synthetic rubber, latex, a resin (for example "Beckacite"), which products are the current components of pressure-sensitive adhesives.

All the above relates to containers but the invention equally protects the assembly of all objects by the same processes and the objects obtained.

What I claim is:

1. A method for making flexible containers, comprising securing to each other adjacent edges of laminated material characterized in that a first of said adjacent edges has an inner layer having an end edge that terminates short of the end edge of an outer layer, and a second of said adjacent edges has an outer layer having an end edge that terminates short of the end edge of an inner layer, by securing to each other the surfaces of said inner layers that are on the sides of said inner layers opposite said outer layers over a width that does not exceed the distance by which said outer layer of said second adjacent edge terminates short of its associated inner layer, and folding over and securing said edge of the outer layer of said first adjacent edge and the joined edges of the inner layers in superposed relation outwardly of the outer layer of said second adjacent edge.

2. A method as claimed in claim 1, in which said inner layers are of thermoplastic material and their adjacent edges are heat welded together.

3. A method as claimed in claim 1, in which said outer layers are of woven reinforcing fabric.

4. A method as claimed in claim 1, and separating a portion of the inner and outer layers of said first adjacent edge prior to securing to each other the edges of said inner layers.

5. A method as claimed in claim 1, said first and second adjacent edges being opposite edges of the same piece of laminated material.

6. A method as claimed in claim 1, said first and second edges being disposed on different pieces of laminated material.

7. A flexible container of laminated material having a seam between two adjacent edges of the material of the container, characterized in that a first of said adjacent edges has an inner layer having an end edge that terminates short of the end edge of an outer layer and a second of said adjacent edges has an outer layer having an end edge that terminates short of the end edge of an inner layer, the surfaces of said inner layers that are on the sides of said inner layers opposite said outer layers being secured to each other over a width that does not exceed the distance by which said outer layer of said second adjacent edge terminates short of its associated inner layer, said edge of the outer layer of said first adjacent edge and the joined edges of the inner layers being folded over and secured in superposed relationship outwardly of the outer layer of said second adjacent edge.

8. A container as claimed in claim 7, in which said inner layers are of thermoplastic material and their adjacent edges are heat welded together.

9. A container as claimed in claim 7, in which said outer layers are of woven reinforcing fabric.

10. A container as claimed in claim 7, said first and second adjacent edges being opposite edges of the same piece of laminated material.

11. A container as claimed in claim 7, said first and second edges being disposed on different pieces of laminated material.

References Cited by the Examiner

UNITED STATES PATENTS

| | | | |
|---|---|---|---|
| 1,136,380 | 4/15 | Terry | 156—304 |
| 1,199,782 | 10/16 | Gruman | 2—275 |
| 1,756,919 | 4/30 | Becker et al. | 2—275 |
| 2,283,698 | 5/42 | Redman | 161—256 |
| 2,711,985 | 6/55 | Olson | 156—286 |
| 2,776,232 | 1/57 | Shearer | 161—256 |
| 2,813,054 | 11/57 | Nicholas | 156—93 |
| 2,817,615 | 12/57 | Abramson | 161—36 |

FOREIGN PATENTS 4,218  1902  Great Britain.

EARL M. BERGERT, *Primary Examiner.*

DOUGLAS J. DRUMMOND, *Examiner.*